June 11, 1929.  J. A. McGREW  1,717,054
TRACTOR TRUCK GEARING
Filed July 8, 1925  2 Sheets-Sheet 1
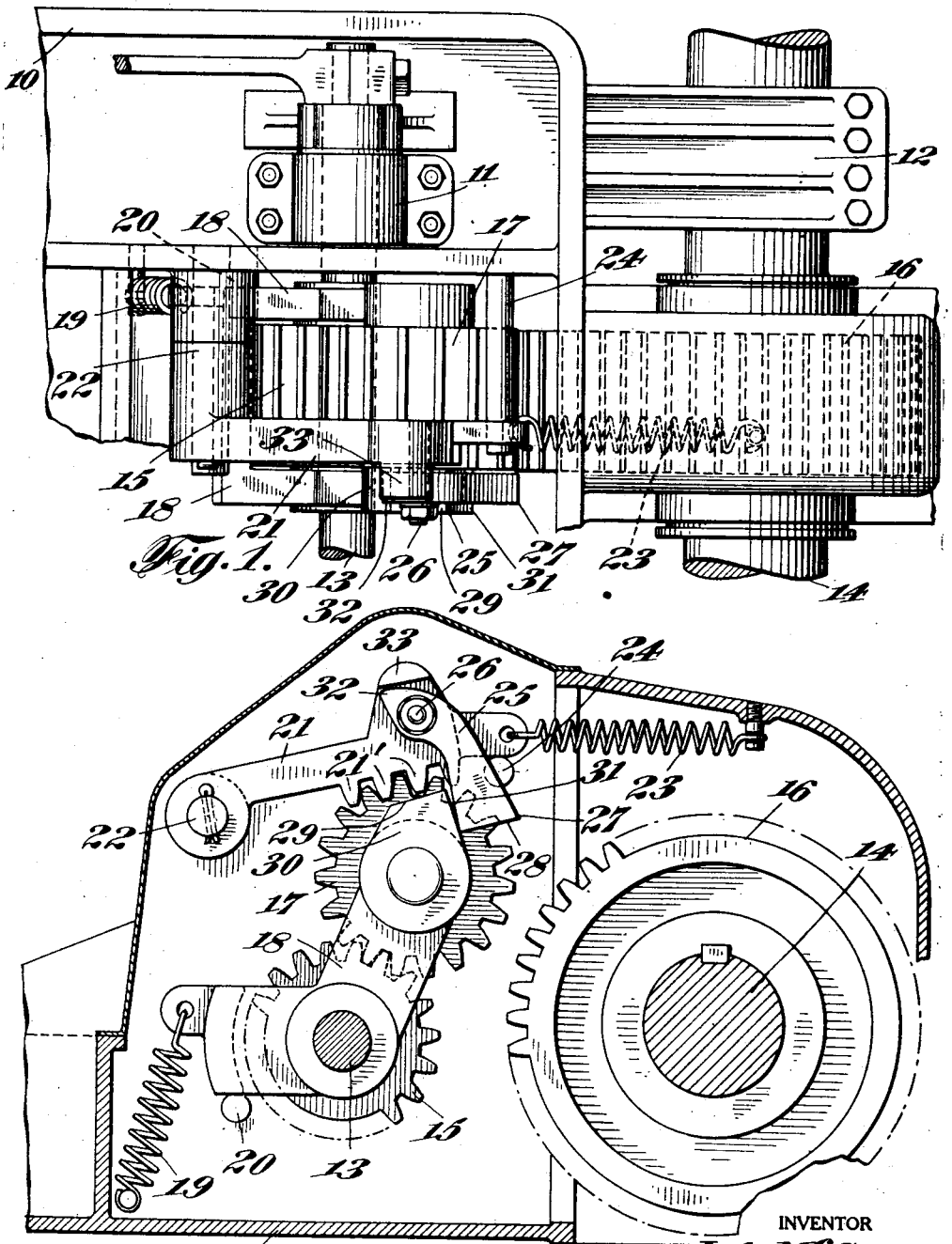

June 11, 1929.    J. A. McGREW    1,717,054
TRACTOR TRUCK GEARING
Filed July 8, 1925    2 Sheets-Sheet 2

INVENTOR
J. A. McGrew.
BY
R. S. A. Dougherty
a. B. Reavis
ATTORNEYS

Patented June 11, 1929.

1,717,054

UNITED STATES PATENT OFFICE.

JOHN A. McGREW, OF ALBANY, NEW YORK, ASSIGNOR TO BETHLEHEM STEEL COMPANY.

TRACTOR-TRUCK GEARING.

Application filed July 8, 1925. Serial No. 42,161.

My invention relates to connectible and disconnectible gearing of a type peculiarly suitable for connecting a source of power to a driven member, and more particularly my invention relates to a system of gearing which is peculiarly suitable for connecting an engine or motor to a driven member such as an axle of a railway vehicle.

In my application, Serial No. 732,484, filed August 16, 1924, I disclose and claim a system of gearing for connecting and disconnecting an auxiliary motor, for example, a steam engine, with respect to a driven shaft or member, for example, the axle of a railway vehicle. The system of gearing disclosed and claimed in said application is characterized by the presence of a tumbler gear which is maintained constantly in mesh with a driving gear and which moves into mesh with the driven gear wholly due to movement being imparted to the driving gear in one direction. In order to prevent the tumbler gear from merely spinning about its axis when the driving gear is turned as stated, I employ a rack member which engages with the tumbler gear when the latter is in demeshed position, the rack member serving to restrain free rotary movement of the tumbler gear about its axis, whereby, when the driving gear is turned in one direction, movement of the tumbler gear on the rack causes the latter and its carrier to move angularly in order that the tumbler gear may mesh with the driven gear. My present invention relates to an improvement upon the system of gearing and restraining means for the tumbler gear disclosed and claimed in my application aforesaid. In accordance with my present invention, I provide a rack member for engagement with the tumbler gear when the latter is in its demeshed position so that when the driving gear is turned in one direction the tumbler gear and its carrier will be moved angularly in order to mesh the tumbler gear with the driven gear, and the rack member has a pawl pivoted thereto which is adapted to be brought into engagement with a suitable abutment surface on the carrier when the tumbler gear is meshed with the driven gear, the carrier cooperating with the pawl, when the tumbler gear moves in a demeshing direction, to move the rack so that the teeth thereof will not engage with the teeth of the tumbler gear until the tumbler gear and its carrier have moved angularly in a demeshing direction to a predetermined extent. In other words, one of the principal objects of my present invention is to control the time at which engagement of the rack member with the tumbler gear shall take place when the latter moves in a demeshing direction, in this way, assuring that the tumbler gear shall move to its predetermined position and that the rack member shall be properly engaged with the teeth of the tumbler gear when the latter is in said position.

These and other objects are accomplished by the apparatus shown and described as will be apparent from the following specification and the accompanying drawings, forming a part of this application, in which:

Fig. 1 is a fragmentary plan view showing my improved gearing;

Fig. 2 is a vertical and fragmentary sectional view of apparatus shown in Fig. 1.

Figure 3:
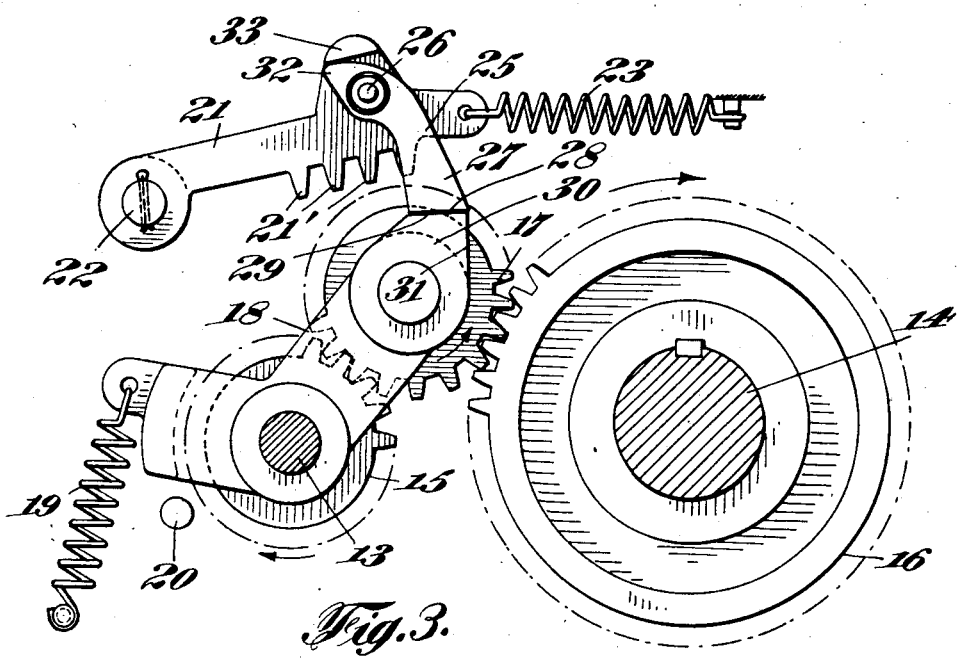
Figs. 3 and 4 are diagrammatic views showing operative relations of my apparatus.

Referring now to the drawings more in detail, I show a suitable supporting structure, at 10, provided with bearings 11 and 12 for driving and driven shafts or members 13 and 14, respectively. The member 10 is specially intended for supporting engine cylinders or motors (not shown) and the shaft 13 is a driven shaft or crank shaft of such motors or engines. The shaft 14 is a load bearing axle of a railway vehicle.

The driving and driven shafts or members 13 and 14 carry driving and driven gears 15 and 16, respectively, the driving gear being constantly in mesh with a tumbler gear 17 pivotally mounted on a carrier 18 which is movable angularly with respect to the axis of the driving shaft 13 in order to move the tumbler gear 17 into predetermined meshed and demeshed positions with respect to the driven gear 16.

A spring 19 has one end connected to the frame or support 10 and the other end connected to the carrier 18, this spring tending to move the carrier 18 in a demeshing direction. A stop 20 of any suitable type is carried by the frame or supporting structure 10 and serves to limit movement of the carrier in a demeshing direction.

With the gearing in the position shown in Fig. 2, if it is desired to mesh the tumbler gear 17 with the driven gear 16 when the driving gear 15 is moved in a clockwise direction, it is necessary to restrain free rotary or spinning motion of the tumbler gear 17. Hence, I provide a rack member 21 having teeth 21' arranged to engage between teeth of the tumbler gear 17 when the latter is in its predetermined demeshed position, as shown in Fig. 2. The rack member is pivotally connected to the supporting structure or housing 10, at 22, the axis of the pivot 22 being preferably disposed forwardly of the axes of the gears 15, 16 and 17. A spring, or other suitable biasing means, 23, has one end connected to the support 10 and the other end connected to the rack member 21 at the end thereof opposite to its pivoted end, the spring serving to normally bias the rack member for angular movement toward the tumbler gear. A stop 24 is provided for limiting angular movement of the rack member toward the tumbler gear to a predetermined extent.

With the apparatus so far described, it will be apparent that, upon clockwise movement of the driving gear 15, the tumbler gear 17 will tend to move in a counterclockwise direction; however, free counter-clockwise movement of the tumbler gear is prevented due to the engagement thereof with the rack teeth 21'. It therefore follows that the tumbler gear moves about its axis and is translated, that is, the rack serves to positively assure that the tumbler gear 17 and its carrier 18 shall move in a clockwise direction when the driving gear 15 is moved clockwise in order to bring the tumbler gear 17 into mesh with the driven gear 16.

Owing to the fact that the tumbler gear 17 and the carrier 18 possess a considerable mass effect, inertia may be relied upon to carry the tumbler gear 17 into initial engagement with the driven gear 16 even though disengagement of the tumbler gear 17 from the rack teeth 21' shall have taken place before such initial engagement. As a matter of fact, although it would be possible to make the disengagement of the tumbler gear from the rack teeth 21' overlap the initial engagement of the tumbler gear with the driven gear 16, I prefer that the tumbler gear shall be entirely disengaged from the rack teeth 21' before initial engagement thereof with the driven gear takes place. It will be apparent that the arrangement of the gears 15, 16 and 17 is such that, with rotation of the gears in the directions indicated by the arrows, and as the driving gear 15 is moving or tends to move at a greater peripheral speed than the driven gear 16, the tumbler gear 17 tends to crowd or mesh with respect to the driven gear 16 due entirely to the transmission, that is, this arrangement of gearings assures that a portion of the power applied to the driving gear 15 shall be effective to complete the act of meshing the tumbler gear 17 with the driven gear 16 and to maintain the latter gears in meshed relation as long as the gear 15 is the driving gear.

When the tumbler gear 17 is moved to its demeshed position, as indicated in Fig. 2, it is desirable that this movement shall take place readily and also that the rack member 21 shall be brought into proper relation with respect thereto in a certain and facile manner. To this end, I have provided displaceable spacing means between the rack member and the carrier 18, this means becoming effective when the tumbler gear 17 is meshed with the driven gear 16 to positively space the rack member 21 from the tumbler gear 17 so that movement of the tumbler gear and its carrier in a demeshing direction to a predetermined extent may freely take place without the teeth of the tumbler gear coming into contact with the teeth of the rack member.

Figure 4:
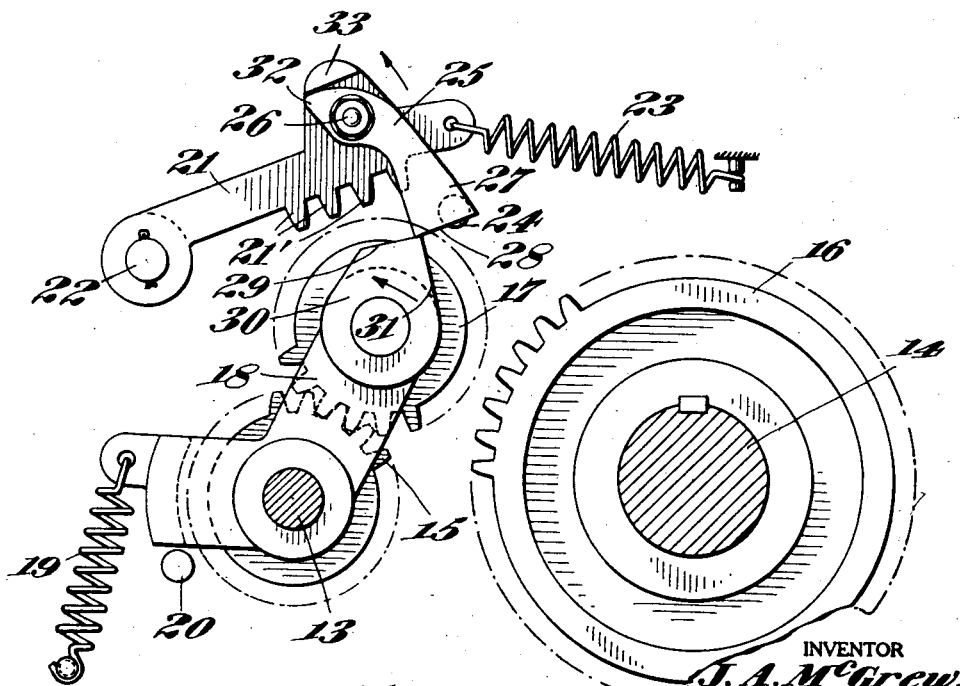

More particularly, for the purposes just stated, I show a pawl member 25 pivoted at 26 with respect to the rack member 21, the pawl having a depending portion 27 which extends downwardly and to the driven gear side of the normal to the rack member and intersecting the axis of the pivot 26. The depending portion 27 of the pawl terminates in a lower abutment surface 28 which is adapted to coact with an upper abutment surface 29 carried by a portion 30 of the carrier 18. As shown in Fig. 2, the portion 30 also has a lateral surface 31 which engages the depending portion 27 at the side thereof adjacent to the pivot 26. Assuming that the arrangement of parts shown in Fig. 2 is the initial position and that the gear 15 is turned in a clockwise direction, it will be apparent that the tumbler gear 17 and its carrier 18 will be moved angularly in a clockwise direction to mesh the tumbler gear with the driven gear 16. While the tumbler gear and its carrier are moving in this direction, the pawl member 25 will be tilted forwardly and the abutment surface 28 will be brought into cooperative relation with the abutment surface 29 when the tumbler gear 17 is fully meshed with the driven gear 16, this position of the pawl being shown in Fig. 3. When the tumbler gear 17 and the carrier 18 move in a counterclockwise direction, or in a demeshing direction, the pawl member 25 and the cooperating portion 30 of the carrier serve to keep the rack member 21 spaced from the tumbler gear 17 until movement in the demeshing direction is almost completed. As may be seen from Fig. 4, such movement results in upward movement of the rack 21 and tensioning of the spring 23; and when continued movement of the carrier 18 in a counter-clockwise direction results in the abutment surface 29 passing beyond the abutment surface 28, the pawl 25 slips off the portion 30 and the spring 23 is then immediately effective to cause the rack member 21 to move toward the tumbler gear 17 in order to mesh rack teeth 21' between teeth of the tumbler gear 17. In this way, it is assured that movement of the tumbler gear in a demeshing direction shall not be interfered with by the restraining means until such demeshing movement is substantially completed, and the arrangement of mechanism also assures that the rack member shall be so positioned and forces shall be so applied thereto that the rack teeth 21 may be readily engaged between teeth of the tumbler gear 17 when the latter reaches its predetermined demeshed position.

The depending end 27 of the pawl 25 tends normally to cause the latter to move in a clockwise direction about its pivot 26, this clockwise movement being prevented by an abutment portion 32 carried by the pawl member and a coacting abutment portion 33 carried by the rack member 21, the parts 32 and 33 cooperating to limit clockwise movement of the pawl 25 so that the abutment surfaces 28 and 29 may come into proper coactive relation. Attainment of the latter relation is, of course, facilitated by the eccentric weighting effect of the pawl member 25 tending to cause the latter to move normally in a clockwise direction, as heretofore described.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention what I claim as new and desire to secure by Letters Patent is:

1. In a gearing mechanism, the combination of a stationary frame, a driving gear, a driven gear, a tumbler gear constantly in mesh with said driving gear and normally in demeshed relation with respect to said driven gear, a bearing member on said frame and fixed relatively to said stationary frame, a restraining member rotatably mounted on said bearing member and normally engaging the periphery of said tumbler gear to restrain the free movement of same about its axis, whereby upon rotation of said driving gear in one direction said tumbler gear is caused to be moved into meshed relation with respect to said driven gear, and means ineffective during the movement of the tumbler gear toward its meshed position with respect to the driven gear for preventing the engagement of said restraining member with said tumbler gear during a predetermined movement of the latter toward its normal position.

2. In a gearing mechanism, the combination of a driving gear, a driven gear, a tumbler gear constantly in mesh with said driving gear and normally in demeshed relation with respect to said driven gear, a carrier member for said tumbler gear, a restraining member normally engaging the periphery of said tumbler gear to restrain the free movement of same about its axis, whereby upon rotation of said driving gear in one direction said tumbler gear is caused to be moved into meshed relation with respect to said driven gear, and means ineffective during the movement of the tumbler gear toward its meshed position with respect to the driven gear adapted to co-act with said carrier member for preventing the engagement of said restraining member with said tumbler gear during a predetermined movement of the latter toward its normal position.

3. In gearing mechanism, the combination of a driving gear, a driven gear, a tumbler gear meshing with the driving gear, a carrier for the tumbler gear, means for biasing the carrier for movement away from the driven gear, a stop for limiting said movement, a movable rack for engaging with the tumbler gear when the carrier is in engagement with said stop, whereby, when the driving gear is turned in one direction, the carrier and its tumbler gear will be translated angularly in order to mesh the tumbler gear with the driven gear, means for normally biasing the rack toward the tumbler gear to a predetermined extent, means rendered effective during the final stage of enmeshment of the tumbler gear with the driven gear for imparting movement to the rack during the initial period of demeshing movement of the carrier and of the tumbler gear to prevent engagement of the rack with the latter gear, and means dependent upon demeshing movement of the carrier and of the tumbler gear to a predetermined extent to render the last-named means ineffective; whereupon the biasing means for the rack becomes effective to cause the latter to engage the tumbler gear.

4. In gearing mechanism, the combination of a driving gear, a driven gear, a tumbler gear in constant mesh with the driving gear, a carrier for the tumbler gear for confining movement of the latter to predetermined demeshed and meshed positions with respect to the driven gear, a pivoted rack engaging with the tumbler gear when the latter is in its demeshed position, spring means for causing the rack to move toward the tumbler gear, and means for limiting the last-named movement.

5. In gearing mechanism, the combination of a driving gear, a driven gear, a tumbler gear constantly in mesh with the driving gear, a carrier for the tumbler gear for confining movement of the latter to predetermined demeshed and meshed positions with respect to the driven gear, a member overlying the tumbler gear and pivoted about an axis disposed forwardly of the axes of said gears, said member having rack teeth for engagement with the tumbler gear when the latter is in demeshed position, means for biasing said member for movement toward the tumbler gear, means for limiting the last-named movement, and a pawl pivotally connected to said member and having a lower abutment surface, a projection on the carrier having an upper abutment surface adapted to engage beneath the lower abutment surface during the period of final enmeshment of the tumbler gear with the driven gear, said pawl serving to space the member from the carrier when the carrier and its tumbler gear move in a demeshing direction until the upper abutment surface of the carrier moves beyond the lower abutment surface of the pawl, whereupon the biasing means for the member is effective to causes the rack teeth thereof to engage with the tumbler gear.

6. In gearing mechanism, the combination of a driving gear, a driven gear, a tumbler gear constantly in mesh with the driving gear, a carrier for the tumbler gear for confining movement of the latter to predetermined meshed and demeshed positions with respect to the driven gear, a rack member having teeth for engagement with the tumbler gear when the latter is in its demeshed position, means for biasing the rack member toward the tumbler gear to a predetermined extent, and spacing means rendered effective between the rack member and the carrier during the period of final enmeshment of the tumbler gear with the driven gear in order that the rack member may be maintained out of engagement with the tumbler gear, when the latter moves in a demeshing direction, until movement in the latter direction has taken place to a predetermined extent.

7. In gearing mechanism, the combination of a driving gear, a driven gear, a tumbler gear constantly in mesh with the driving gear, a carrier for the tumbler gear for confining movement of the latter to a predetermined meshed and demeshed positions with respect to the driven gear, a pivotally mounted rack member, a spring for moving the rack member angularly about its pivot to engage the teeth thereof with the tumbler gear when the latter is in demeshed position, means for limiting angular movement of the rack member due to the spring, a pawl pivotally connected to the rack member and having a lower portion which extends downwardly and to the driven gear side of it pivot and said pawl being provided with a lower abutment surface, a portion carried by the carrier and formed with a lateral surface adapted to engage with the pawl laterally at the side of the latter adjacent to the pivot axis when the tumbler gear is in demeshed position and with an upper abutment surface which is adapted to engage beneath the lower abutment surface of the pawl when the tumbler gear is meshed with the driven gear, said portion of the carrier and said pawl cooperating to maintain the rack member spaced from the tumbler gear when the latter moves in a demeshing direction until the upper abutment surface of said portion moves by the lower abutment surface of the pawl whereupon the rack member is free to move to engage with the tumbler gear and the pawl engages with said portion laterally.

8. In gearing mechanism, the combination of a driving gear, a driven gear, a tumbler gear constantly in mesh with the driving gear, a carrier for the tumbler gear for limiting movement of the latter to predetermined demeshed and meshed positions with respect to the driven gear, spring means normally tending to move the carrier toward demeshed position, a pivoted rack for engagement with the tumbler gear when the latter is in demeshed position, whereupon, when the driving gear is turned in one direction, the tumbler and its carrier are translated to mesh the tumbler gear with the driven gear, a pawl pivotally connected to the rack, means carried by the carrier for engagement with the pawl when the tumbler gear is meshed with the driven gear, said means and pawl serving to maintain the rack out of engagement with the tumbler gear when the latter moves in a demeshing direction to a predetermined extent, and means for moving the rack member toward the tumbler gear when the pawl is disengaged from said means in order that the rack may be engaged with the tumbler gear.

9. In gearing mechanism, the combination of a driving gear, a driven gear, a tumbler gear constantly in mesh with the driving gear, a carrier for the tumbler gear for limiting translatory movement of the latter to predetermined meshed and demeshed positions with respect to the driven gear, a spring tending to cause the carrier to move in a demeshing direction, a stop for limiting movement of the carrier in the latter direction, a pivoted rack for engagement with the tumbler gear when the latter is in demeshed position, a pawl pivotally connected to the rack and having a depending portion which extends inwardly toward the driven gear and terminates in a lower abutment surface, means for limiting angular movement of the pawl about its axis due to the weight of its depending end, a portion carried by the carrier and having an upper abutment surface adapted to be brought into cooperation with the lower abutment surface of the pawl when the tumbler gear is meshed with the driven gear, said portion and pawl serving during demeshing movement of the carrier and of the tumbler gear to a predetermined extent to maintain the rack out of engagement with the tumbler gear, and means for moving the rack toward the tumbler gear when said portion and pawl are disengaged.

In testimony whereof I hereunto affix my signature this 20th day of June, 1925.

JOHN A. McGREW.